W. RITSCHARD.
COMBINATION TOOL.
APPLICATION FILED JULY 7, 1910.
1,035,237.
Patented Aug. 13, 1912.
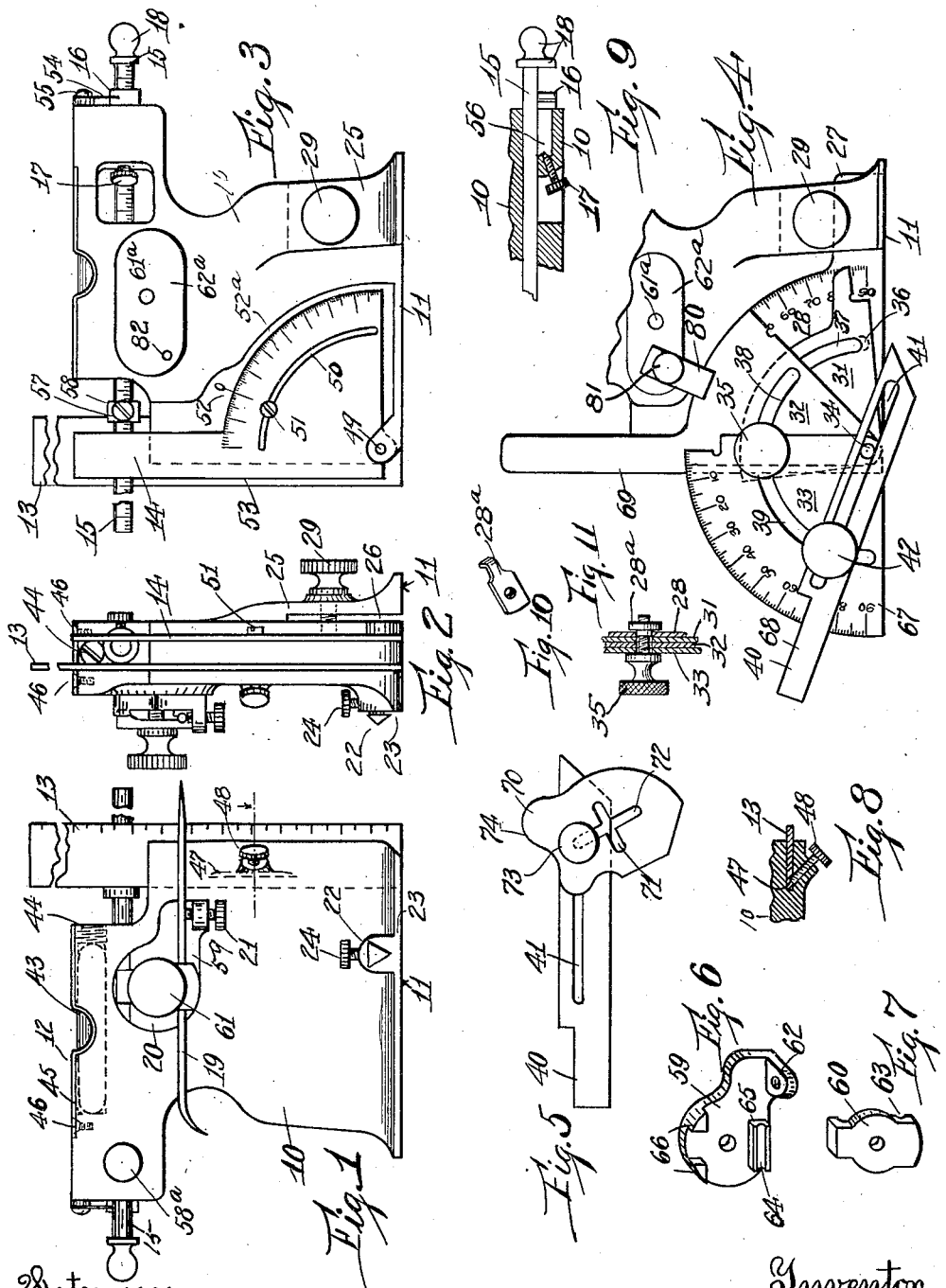
Witnesses
G. E. Mueller
H. A. Ernst
Inventor
William Ritschard
by Thomas H. Ferguson
Atty.
COLUMBIA PLANOGRAPH CO., WASHINGTON, D. C.

UNITED STATES PATENT OFFICE.

WILLIAM RITSCHARD, OF DETROIT, MICHIGAN.

COMBINATION-TOOL.

1,035,237.  Specification of Letters Patent.  Patented Aug. 13, 1912.

Application filed July 7, 1910. Serial No. 570,844.

*To all whom it may concern:*

Be it known that I, WILLIAM RITSCHARD, a citizen of the United States, residing at Detroit, county of Wayne, State of Michigan, have invented certain new and useful Improvements in Combination - Tools, of which the following is a specification.

The object of the present invention is to provide a novel combination tool-stand, in which the associated tools and measuring devices are arranged so that they may be readily utilized in performing their several individual and coöperative functions.

The device is adapted for use on the usual surface plate employed by machinists and other workmen and is provided with parts for performing the functions of a square, protractor, bevel gage, surface gage, scale gage, level, etc.

The invention includes the general arrangement of the various parts, their relative arrangement, and certain features individual to the parts themselves.

The specific nature of the invention and its several advantages will be best understood upon reference to the following detailed description taken in connection with the accompanying drawing, and the scope of the invention will be particularly pointed out in the appended claims.

In the drawing, Figure 1 is a side elevation of the tool-stand and associated tools, except protractor plates; Fig. 2 is an end elevation of the same; Fig. 3 is an elevation of the side opposite to that of Fig. 1; Fig. 4 is a view similar to Fig. 3, illustrating the said protractor plates and the means of attaching them to the stand; Figs. 5, 6, 7, 8, 9, 10 and 11 are details of various parts.

Throughout these views, like characters refer to like parts.

Referring to the drawing in detail, 10 designates the body of the tool-stand, which has a relatively large flat under surface 11, which is adapted to rest upon the surface plate or other smooth flat surface employed by the mechanic who will use the device. The upper portion of the body 10 is provided with a spirit level 12, while the end illustrated in Fig. 2 is provided with a longitudinally movable scale 13 extending at right angles to the flat bearing surface 11, and a protractor plate 14 similarly positioned, but capable of being adjusted in a forward and backward motion a few degrees to the right and several to the left of its right-angled position for the purpose of providing "draft" when the device is used in the making of patterns. A gage rod 15 extends through a bore in the upper portion of the body 10 in a direction substantially parallel to the bearing surface 11, and at its free end is adapted to extend beyond the scale 13 and protractor plate 14 with reference to which it may be adjusted for various uses, such as that of a depth gage. The gage rod 15 is also provided with an index block 16, which block may be adjusted by means of a slow motion screw 17 Fig. 9 to provide accurate distances between it and the shoulder 18 on the head of the rod 15 for the use of setting inside calipers. A scriber 19 is adapted to be secured to either side of the body 10 by a holder 20, whose adjusting screw 21 provides a ready adjustment for the free end of the scriber to give different heights from the bearing surface so that the same dimension or dimensions may be laid off at different points on the same or different pieces of work. A scratch gage 22 is located adjacent to the longitudinal edge 23 of the body 10 and is adapted to be set in various transverse positions by the thumb screw 24. When thus set, the device may be drawn along with the edge 23 pressing against the edge of the work to be marked, and the sharp corners of the gage 22 utilized in marking the same. On the same side of the body 10 as the adjustable plate 14, but on the opposite end of the body from it, the body is provided with an arm 25, which is separated from the body proper by a slit 26, Fig. 2 into which a projection 27 Fig. 4 on the protractor 28 is adapted to be inserted to attach the latter to the body 10. A clamping screw 29, passing through the arm 25 and into the body 10, clamps the protractor in position. Other protractor plates 31, 32 and 33 Fig. 11 are mounted with the plate 28 upon a common pivot 34 Fig. 4. This pivot is used solely to connect these plates together, as explained, and has no connection with the stand itself. A clamping screw 35 is adapted to pass through concentric slots 36, 37, 38 and 39 in said plates to clamp them relatively to each other. A slide bar 40, having a slot 41, which may be passed over the pivot 34, may be variously positioned upon the protractor plates and clamped by means of clamping screw 42 and an associated nut.

The spirit level 12 comprises the usual glass tube 43, filled with alcohol or other spirit. In order to set this tube, the body 10 is provided with a horizontal bore near its upper edge; the tube 43 is positioned in this bore and held there by means of a screw 44 which passes into the tapped end of the bore. Some suitable cementitious substance, such as plaster of Paris, is also used in the bore to hold the tube in its proper level position. A plate 45 also may be secured to the top of the body 10 by means of screws 46; but it will be understood that this latter plate may be omitted if desired. It will, of course, be apparent that when the flat under surface 11 of the device is resting on a level surface, the air bulb in the tube will then lie in the center of the depressed portion of the plate 45, or of the depression in the adjacent portion of the body 10, in case such plate is not employed.

The scale 13 is positioned in a kerf cut in the end of the body portion 10 and is provided with a short groove 47, into which the end of a set screw 48 enters Fig. 8. This screw is threaded through the adjacent portion of the body 10 and may be screwed into firm engagement with the scale 13 so as to hold it against movement. When the screw pressure is slightly relieved, the scale 13 may be adjusted longitudinally. This scale is always maintained with its free edge at right angles to the plane of the under surface 11 of the device. It will be obvious that it forms, with this under surface, a square, and consequently it may be used to perform the usual offices of a square. This is particularly useful to pattern makers. The adjustable graduated protractor plate 14 is pivoted at 49 to one side of the stand and adjacent to its under bearing face 11. It is provided with a slot 50 and a set screw 51 by which its free edge may be given an adjustment of a few degrees (say, six or eight) to the right of its vertical position, and several degrees (say, sixty or seventy) to the left of that position. The index point 52—or other graduation marks—on the body 10 are arranged with reference to the graduations 52ᵃ upon the protractor plate 14, so that when the zero position of the former registers with a definite position (say, the twenty degree position) of the latter, the free edge 53 of the plate 14 will be exactly perpendicular to the plane of the under surface 11 and consequently parallel to the free edge of the scale 13. It will also be noted that the free edge 53 of the plate 14, when in its vertical position, extends a short distance (say, three-sixteenths of an inch) beyond the end of the body 10. In consequence of this, when the scale 13 is removed, the edge 53 of the plate is free to be used for the drawing of lines upon the work upon which it is being used through a short range of adjustment from vertical in one direction and a considerable range in the opposite direction. In other words, with the scale 13 removed, the end of the body 10 does not interfere with the drawing of lines along the edge 53 for slight adjustments of the plate 14 to the right (see Fig. 3) or for considerable adjustments to the left. This plate is particularly adapted to the use of pattern makers in providing "draft" for patterns; that is to say, in providing the substantially vertical faces of patterns with slight inclination so that they may be readily withdrawn from the molding sand when used. When so used, it is only necessary to give the free edge 53 a slight adjustment either way from its vertical position. On the other hand, its plate may be given a wide range of adjustment in one direction from its vertical position when it is to be employed as an ordinary protractor.

The gage rod 15 has a flattened side upon which any desired scale may be laid off, and this flattened surface bears against one side of the adjustable plate 14 so that the scale may be readily read from the end of the rod up to the free edge of the plate 14. This end of the rod may thus be used in coöperation with the plate 14 in various ways. Thus it may be used as an ordinary depth gage by passing the end of the rod into the opening whose depth is to be measured, or again, it may be used to measure horizontal distances upon curved surfaces. For example, if it be desired to accurately locate the position of a key seat upon a shaft, this may be done by setting the free end of the rod 15 so as to leave it extending beyond the plate 14 a distance equal to one-half the diameter of the shaft. Then, upon placing the edge of the shaft against the plate 14 and the rod 15—maintained in its adjusted position—the exact position of the center of the key seat will be determined by the end of the rod 15. As previously pointed out, the opposite end of the rod may have its collar 18 set by hand an approximate distance from the index block 16, and the latter may be adjusted by the screw 17 so as to set the distance between the block and the collar exactly. The block 16 is secured to the lower end of a leaf spring 54, whose upper end is secured by a screw 55 to the adjacent portion of the body 10. The index block 16 is provided with a tail piece 56, which extends along the flat face of the gage rod 15 a short distance into the bore formed in the body 10. At its inner end, the tail piece 56 is engaged by the adjusting screw 17, which is threaded through an adjacent portion of the body 10. By means of this screw 17, the tail piece 56 and the connected index block 16 may be readily and accurately adjusted with reference to the scale upon the gage rod 15. As before stated, this feature of the invention is particularly applicable to the setting of inside calipers. It will also be observed that the movement of the rod 15 may be limited by a collar 57 having a clamping screw 58. This collar surrounds the rod and may be clamped in any given position upon it by means of the screw 58. By reason of this, the extent to which the rod 15 may be moved to the right or the left may be definitely fixed, by reason of the collar engaging the adjacent portion of the device. This may be useful in certain kinds of work where it is desired to constantly refer back to a given dimension. It will be understood also that the collar 57 may be removed from the rod 15 and the rod then withdrawn from the stand. In such case, the rod 15 may be used alone with the collar 57 as a depth gage. In addition to these various means of adjustment, the rod 15 is also provided with a set screw 58ª, which passes through a threaded opening in the body 10 and bears against the rod 15. When it is screwed down, the rod 15 is clamped against movement.

As illustrated in the drawing, the holder 20 for the scriber 19 is positioned on the opposite side of the stand from the adjustable protractor plate 14 and the adjusting screw 17 of the gage rod 15. This holder is made up of four parts,—the clamping member 59 illustrated in Fig. 6, the clamping member 60 illustrated in Fig. 7, the screw 61 passing through these two clamping members into threaded engagement with the body 10, and the adjusting screw 21 passing through the threaded engagement of the lug 62 on the member 59. The scriber 19 lies in the mating grooves 63, 64, formed respectively in the member 60 and in a projection 65 on the member 59. The upper end of the member 60 is adapted to lie between projections 66 on the member 59 when the parts are in operative position.

From the illustration in Fig. 1, it will be at once apparent that the scriber 19 may have its free end roughly adjusted by positioning the holder 20 and then screwing down the screw 61, and that it may have its free end more accurately adjusted by means of the screw 21. The holder 20 for the scriber 19 may be positioned on either side of the stand and the hole 61ª on the boss 62ª Fig. 3 is provided for this purpose, the screw 61 being screwed into it when the scriber is placed on this side of the stand.

It will be apparent that in the use of the scriber, its free end may be readily adjusted to give different heights from the bearing surface 11, so that the same dimension or dimensions may be laid off at different points on the same or different pieces of work. Where it is desired merely to lay off vertical distances against the edge or side of a piece of work, the scriber is positioned so that its straight end is the free end and the end adjustable by the screw 21. When the scriber is to reach out over work and touch upon different flat surfaces, then it is positioned so that its curved end is free and capable of adjustment by the screw 21. In this latter use, it will be seen that with the point of the curved end of the scriber set for a given dimension, different horizontal surfaces on the same or different pieces of work may be accurately positioned with reference to the surface plate upon which the bearing surface 11 of the tool rests.

As before pointed out, a slot or a kerf 26 extends upward from the under face of the stand so as to form a clamping arm 25 between which and the main portion of the stand the projection 27 on the protractor plate 28 may be clamped. It will be apparent that when the tool stand is set upon a surface plate and the lower edge of the plate 28 is brought to bear against the surface plate and the clamping screw 29 is then screwed down, the lower edge of the plate 28 will be coincident with the surface of the under face 11. Consequently, angles measured off by means of the protractor will accurately measure angular distances from this plane. Although in the drawing I have illustrated the four protractor plates 28, 31, 32, 33, all mounted upon the same pivot, is it not necessary that all these plates be used at the same time. Pivot 34 is made fast to the plate 28, and the other plates may be slipped on and off of this pivot. For ordinary protractor measurements, I preferably employ plates 28 and 33, omitting plates 31 and 32. In such event, the zero point on the scale of the plate 33 may be set at any desired scale marking upon the plate 28 and the edge 67 of the plate 33 used as the marking edge. Again, in other instances, the slide bar 40 may be positioned on the protractor plates, as illustrated in Fig. 4, and the edge 68, which is in line with the pivot 34, used to lay off the desired angle. The plate 31 may be substituted for the plate 33 whenever the character of the work is such that the marking edge 67 of the plate 33 is too long. I find that in practice, these two plates, when their marking edges are given lengths of approximately one and a half and one and an eighth inches respectively, they will care for the ordinary work which a workman is likely to encounter, although of course, if desired, plates having edges of greater or less length might be employed.

The plate 32 may be used with the plate 28 in much the same way as the plate 14 is used upon the stand 10,—that is, for providing "draft" on patterns. It will be noted that the free edge 69 of the plate 32, when set at right angles to the lower edge of the plate 28, extends a short distance (say, three-sixteenths of an inch) beyond the adjacent parallel edge of the plate 28. In this way, when the plate 32 is adjusted so as to set the edge 69 a few degrees either side of the vertical, it leaves a free edge for the drawing of a line upon the work without interference from the adjacent edge of the plate 28. It will be observed that when either two or more of the protractor plates are employed, they are secured together by the adjusting screw 35. As illustrated in Fig. 10, the nut 28ᵃ of this screw has an upturned lug which is adapted to pass into the slot of the adjacent plate, such as the slot 36 of the plate 28, and thus be prevented from turning. I also provide a clamping plate 80 which is similar in shape to the plate 60, illustrated in Fig. 7. This plate, like plate 60, has a heel at one end which is adapted to bear against the body 10, while its free end is adapted to extend out over the edge of the protractor plates 28, 32 and 33. A thumb screw 81, Fig. 4, threaded into a threaded opening 82 Fig. 3 in the boss 62ᵃ, serves to press the free end of the plate 80 against the adjacent protractor plates and thereby holds them more securely in position. I employ this clamping plate and screw whenever it is desired to hold the various protractor plates in one position for a considerable length of time.

In addition to the above, I also employ a templet 70 Fig. 5 in association with the slide bar 40, or with any of the right line edges of the different instrumentalities herein described, such as the edge 67 of the plate 33 of the protractor. This templet is provided with intersecting slots 71, 72, by which it may be adjustably secured to the several instrumentalities. As clearly illustrated in Fig. 5, an adjusting screw 73 passes through the slot 72 in the templet and the slot 41 in the slide bar 40 into engagement with a suitable nut, and the templet and the bar are clamped in desired positions. This templet is of value in "fillet" work and in other instances where it is desired to change from a flat to a curved surface, such as in lathe turning. As illustrated in Fig. 5, the bar 40 and the templet 70 are positioned so as to provide an easy curve between the straight edge of the bar and the sharper curve 74 of the templet. Without further explanation, it is believed it will be apparent that the same templet may be variously positioned upon the slide bar, the plate 33 and other parts, to bring about the desired settings.

From the above description, it will be clearly understood that I have provided a tool stand with associated tools and elements which are capable of a wide variety of use, both individually and coöperatively. It will also be apparent that certain features of the invention are capable of use in other connections than those disclosed. I therefore do not wish to be limited to the specific disclosed uses, but aim to cover, by the terms of the appended claims, all the varied adaptations and applications of the invention.

What I claim as new and desire to secure by Letters Patent of the United States is:—

1. The combination with a tool-stand having a relatively large flat under surface and a clamp on one side of said stand, of relatively movable pivoted protractor plates mounted side by side, one of said plates having a projection adapted to enter said clamp and be clamped to said stand with an edge in line with said under surface.

2. The combination with a tool-stand having a relatively large flat under surface and a clamp on one side of said stand, of relatively movable pivoted protractor plates, one of said plates having a projection adapted to enter said clamp and be clamped to said stand with one edge in line with said under surface and its other edge at right angles thereto, and means for setting the other plate with one of its edges parallel to the latter edge of the first plate, said second plate then extending a definite distance beyond said latter edge of the first plate.

3. The combination with a tool-stand having a relatively large flat under surface, of a protractor plate secured to said stand and adjustable so as to bring its free edge exactly at right angles to said under surface or to a few degrees on either side thereof, means for holding said plate in its several adjusted positions, and a gage rod located near the top of said stand and extending substantially parallel to said under surface and adjustable relative to said free edge.

4. The combination with a tool-stand having a relatively large flat under surface, of a protractor plate secured to said stand and adjustable so as to bring its free edge exactly at right angles to said under surface, means for holding said plate in its adjusted position, a longitudinally movable scale always at right angles to said under surface, and a gage rod located near the top of said stand and extending at right angles to said scale and between said scale and plate and adjustable relative to said scale and plate.

5. The combination with a tool-stand having a relatively large flat under surface and a clamp on one side of said stand, of two protractor plates mounted on a common pivot and having concentric circular slots, one of said plates having a projection for insertion into said clamp, a clamping screw and nut for holding said plates, when set, relatively to each other, a slide bar having a slot into which said pivot passes, and a clamping screw and nut for clamping said bar and one of said plates through the agency of their respective slots.

6. The combination with a tool-stand having a relatively large flat under surface and a clamp on one side of said stand, of two protractor plates mounted on a common pivot and having concentric circular slots, one of said plates having a projection for insertion into said clamp, a clamping screw and nut for setting said plates relatively to each other, a slide bar having a slot into which said pivot passes, a clamping screw and nut for clamping said bar and one of said plates through the agency of their respective slots, a templet having variously shaped edges, and means for setting said templet on said bar and on said sector plates through the agency of their respective slots.

7. The combination of two protractor plates mounted on a common pivot and having concentric circular slots, a clamping screw and nut for setting said plates relatively to each other, a slide bar having a slot into which said pivot passes, and a clamping screw and nut for clamping said bar and one of said plates through the agency of their respective slots.

8. The combination of two protractor plates mounted on a common pivot and having concentric circular slots, a clamping screw and nut for setting said plates relatively to each other, a slide bar having a slot into which said pivot passes, a clamping screw and nut for clamping said bar and one of said plates through the agency of their respective slots, a templet having intersecting slots and variously shaped edges, and means for setting said templet on said bar and on said protractor plates through the agency of their respective slots.

9. The combination with a tool-stand having a relatively large flat under surface and a clamp on one side thereof, of relatively movable protractor plates mounted on a common pivot and concentrically slotted, a clamping screw and nut for setting said plates relatively to each other, a slotted slide bar engaging said pivot, clamping means for setting said bar relative to said plates, an adjustable plate secured to said stand and having a free edge extending substantially at right angles to said under surface, a longitudinally movable scale similarly positioned, a gage rod extending through a bore in said stand and extending outward beyond and between said adjustable plate and scale, an index block associated with said rod, and slow motion adjusting means for said block relative to said rod.

In witness whereof, I hereunto subscribe my name this 2" day of July, 1910.

WILLIAM RITSCHARD.

Witnesses:
JOHN RITSCHARD,
CHARLES W. KURTH.

---

Copies of this patent may be obtained for five cents each, by addressing the "Commissioner of Patents, Washington, D. C."